June 6, 1933.　　　A. C. MEISTER　　　1,912,948
SPECTACLE ACCESSORIES
Filed Feb. 2, 1929
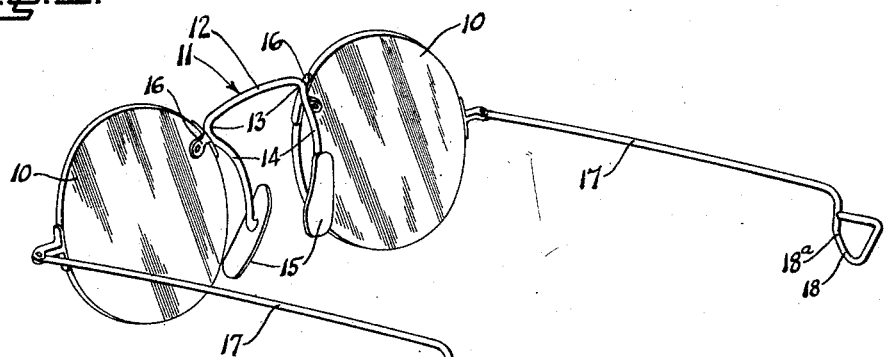
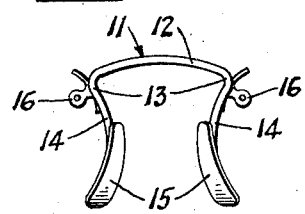
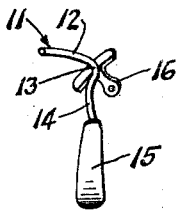
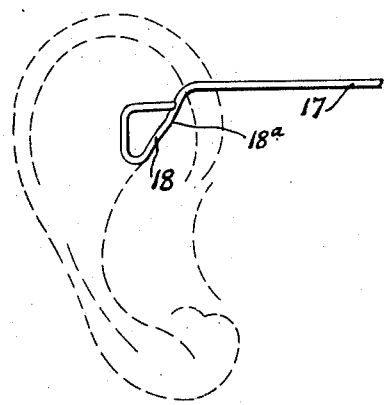
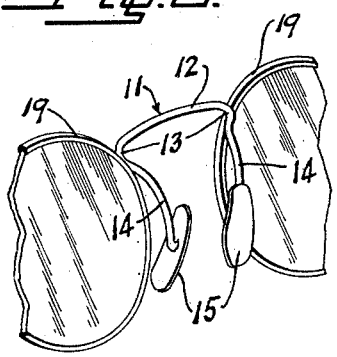
WITNESSES
INVENTOR
Arthur C. Meister
BY
Joshua R. H. Potts
ATTORNEY Patented June 6, 1933

1,912,948

UNITED STATES PATENT OFFICE

ARTHUR C. MEISTER, OF PHILADELPHIA, PENNSYLVANIA

SPECTACLE ACCESSORIES

Application filed February 2, 1929. Serial No. 337,002.

The present invention relates to spectacles and glasses and particularly to the accessories related thereto for connecting the lenses together and for supporting the same on the head of a wearer.

An object of the invention is to improve accessories of this character.

A further object is to so construct these accessories as to diminish the cost of manufacture and at the same time add to their effectiveness and neatness of appearance.

A still further object is to so construct the supporting structure of spectacles that they may be firmly held to and may rest upon the features of a wearer as to be worn with perfect comfort.

A fourth object is to so construct the temples, bridge and nose pads that they will cooperate to the ends of comfort and positiveness of support.

A fifth object is to eliminate objectionable features of temples as now constructed and to adapt the same to the peculiarities of the human skull.

A construction embodying principles designed to accomplish the above objects consists of spectacles either framed or frameless, in which the bridge may be constructed integrally with nose pad supporting shanks and of a single piece of wire or other material. The nose pads or the shanks or both may have sufficient resilience to give slightly to the wedging of the nose therebetween and may be constructed to exert sufficient pressure to effect a clinging thereof to the nose when so wedged. The temples may be constructed to assist the nose pad in supporting the lenses and maintaining them in proper relation to the eyes and to this end the free ends of the temples may be formed with a loop, which may be of a peculiar construction adapted to nest back of the ears and fit certain protrusion on or depressions in the human skull found behind the upper part of the ear and on the ear itself.

For a clearer understanding of the invention, reference may be made to the accompanying drawing, in which Figure 1 is a perspective view of a pair of frameless spectacles embodying the principles of the invention.

Figure 2 is a detail view showing the integral formation of the bridge and pad shanks and the connection of the pads thereto.

Figure 3 is a further detail view showing this connection from a somewhat different angle.

Figure 4 is a detail of one of the temples showing the same in its application to the head of a wearer.

Figure 5 is a view illustrating the application of the bridge construction to a pair of framed lenses.

Referring now to the drawing in detail, 10 designates the lenses of a pair of frameless spectacles which are connected by a bridge construction designated as a whole by the numeral 11 and comprising the bridge proper 12 constructed of wire or other suitable material, which is bent at the ends of the bridge portion, as designated by the numeral 13, and extended rearwardly and then downwardly in a convergent manner to form shanks 14 upon which the nose pads 15 are supported. These shanks may have more or less inherent resiliency and the nose pads 15 may also be constructed of resilient material or mounted on the shanks in such a manner as to render them yielding to the pressure of the nose when wedged therebetween.

At the bends 13 is secured the usual attaching structure 16 by which the bridge is connected to the lenses. This point of connection is important in the invention in that it lends to the strength and durability of the construction as well as leaving a considerable length of the shanks 14 free and capable of yielding movement under pressure and also capable of greater freedom in adjustment to the peculiarity of the features of the wearer. I also provide peculiarly constructed temples 17 which assist the bridge construction in properly and comfortably supporting the spectacles on the features of a wearer.

A characteristic of the temples is the provision at their free ends of loops 18 which eliminate the usual more or less sharp ends commonly found in temples and the hook embracing the ear which has many objectionable failings and also the extended shank resting at a spaced distance rearwardly of the ear common on certain types of temples. These loops have been carefully formed and shaped to take advantage of certain protrusion and depressions in the human skull located just rearwardly of the upper portion of the ears and upon the ear itself.

The shanks of the temples have a sufficient resiliency and are preferably so formed as to exert a yielding pressure through these loops against the side of the wearer's head. This arrangement together with the arrangement of the yielding connection of the nose pads with the bridge provide a construction whereby the spectacles are supported on the features of the wearer with firmness and at the same time with increased comfort to the wearer over constructions heretofore known.

The loop, it will be noted, is somewhat in the shape of the pectoral fins of a fish and this shape peculiarly adapts them to accommodate themselves to the above named cavities. The loop is also formed with a slight protuberance exaggerated at $18^a$ in the drawing and which takes advantage of a certain ridge on the back of the ear.

The construction as shown in Figures 1, 2 and 3 are peculiarly adapted to frameless lenses. Figure 5, on the other hand, shows the application of the bridge construction to the frames of lenses, the only difference being the attachment of the bridge member at the bends to the frames 19 instead of to the attaching structure 16.

The article of manufacture illustrated, it will be understood, may be modified and changed in various ways without departing from the spirit of the invention herein set forth and hereafter claimed.

I claim:—

The combination with optical lenses of a continuous connecting unit bent at acute angles to form an approximately straight bridge section and spaced arms, nose pads carried by the arms, and means securing the unit to the lenses with the upper part of the connecting unit secured substantially in the plane of and adjacent to the upper parts of said lenses and the arms extending in a plane diverging from the plane of the lenses and at the posterior thereof.

In testimony whereof I have signed my name to this specification.

ARTHUR C. MEISTER.